United States Patent [19]
Toyama et al.

[11] 3,950,775
[45] Apr. 13, 1976

[54] INFORMATION DISPLAYING APPARATUS FOR A CAMERA

[75] Inventors: Masamichi Toyama; Tomoshi Takigawa, both of Machida; Noritsugu Hirata; Keiichi Sakaguchi, both of Yokohama; Toshikazu Ichiyanagi, Tokyo, all of Japan

[73] Assignee: Canon Kabushiki Kaisha, Tokyo, Japan

[22] Filed: May 23, 1974

[21] Appl. No.: 472,893

[30] Foreign Application Priority Data
May 28, 1973 Japan.............................. 48-59620

[52] U.S. Cl........ 354/273; 116/114 J; 116/DIG. 26; 350/96 B; 350/110; 352/171; 354/289
[51] Int. Cl.² ............................................ G03B 9/02
[58] Field of Search .......... 354/219, 273, 289, 106, 354/53, 39; 355/1; 352/170–172; 350/96 B, 110; 116/114 J, 114 AJ, 124.4, 129 L, 129 M, DIG. 5, DIG. 26

[56] References Cited
UNITED STATES PATENTS

| | | |
|---|---|---|
| 3,326,104 | 6/1967 | Mische................................. 354/219 |
| 3,421,407 | 1/1969 | Hiruma............................... 354/219 |
| 3,590,703 | 7/1971 | Ono..................................... 354/106 |
| 3,613,532 | 10/1971 | Wildhaber ............................ 355/1 |
| 3,672,286 | 6/1972 | Wagner............................... 354/219 |
| 3,677,619 | 7/1972 | Mackenzie.......................... 354/289 |
| 3,843,248 | 10/1974 | Iyama ................................. 354/289 |

Primary Examiner—John Gonzales
Attorney, Agent, or Firm—William R. Woodward

[57] ABSTRACT

An information displaying apparatus includes, bundles of optical fibers with their ends coplanar and disposed in line. A movable masking member imposes information on the light input to the fiber array. At the output end, information markings are selectively illuminated or otherwise luminously designated to display various kinds of information. Displaying means may be disposed within a view finder or on the outer casing of a camera. An artificial light source operates to provide light through the masking member and may be switched on manually or automatically when needed for information display.

22 Claims, 21 Drawing Figures

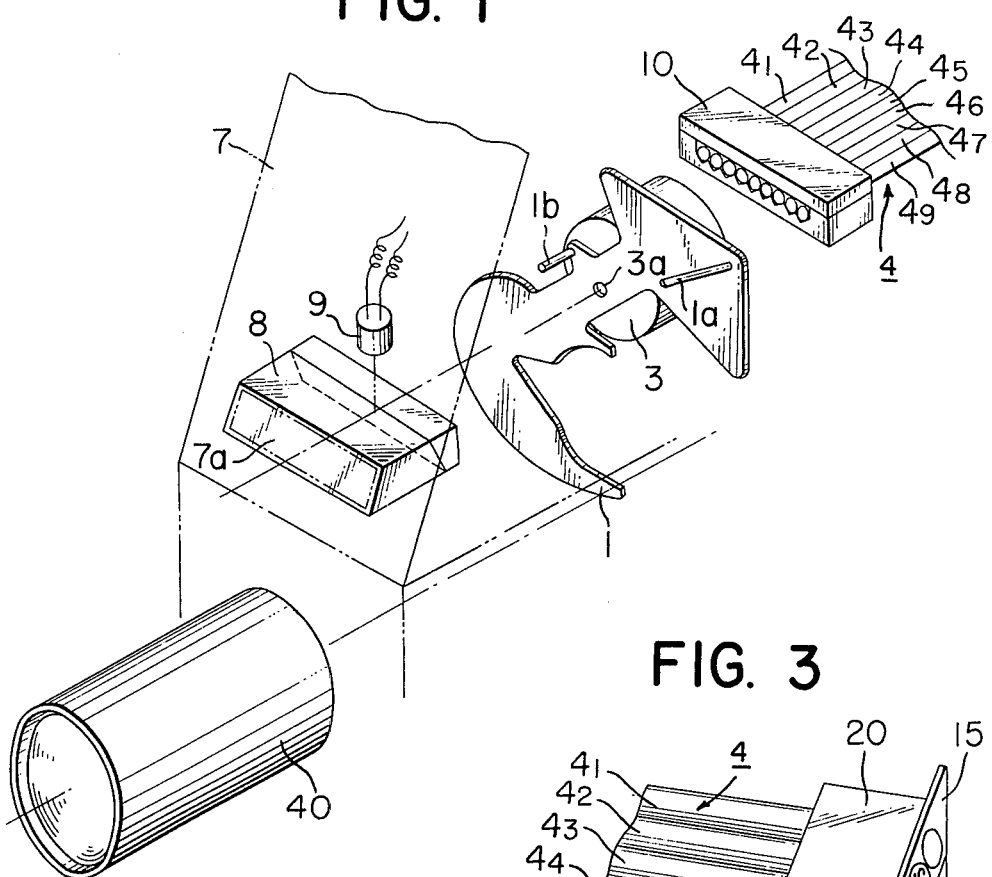
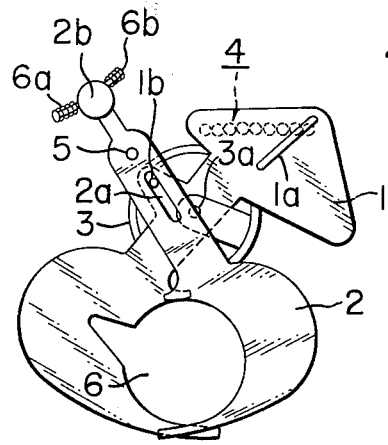
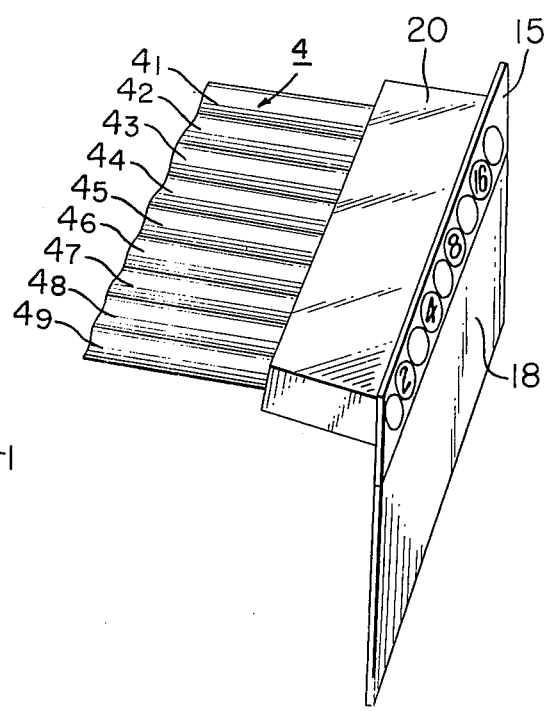

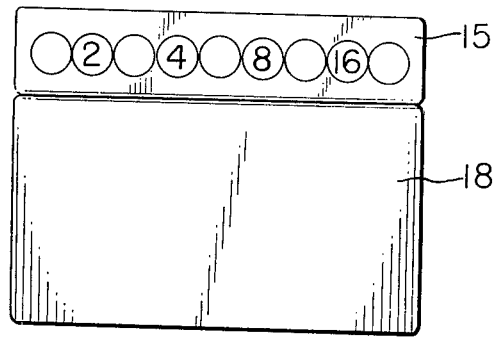
FIG. 4
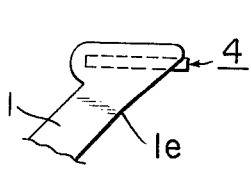
FIG. 5
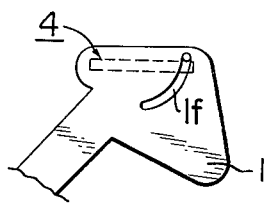
FIG. 6
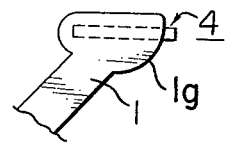
FIG. 7
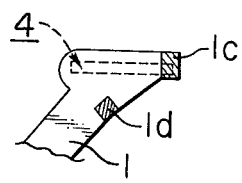
FIG. 8
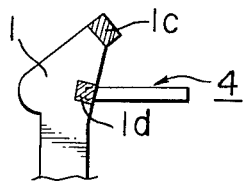
FIG. 9
FIG. 10
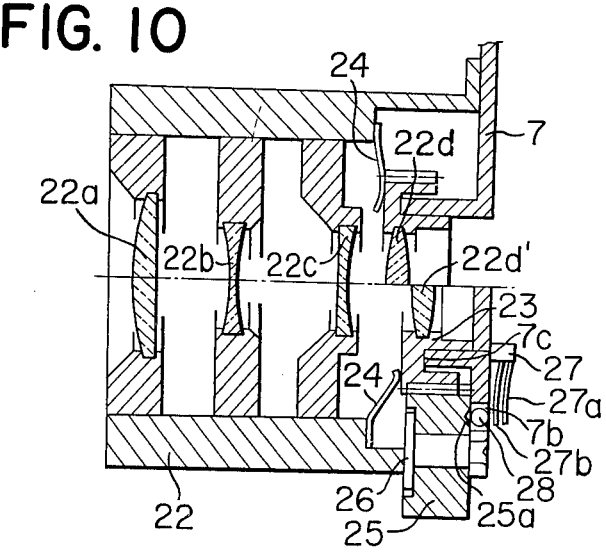

INFORMATION DISPLAYING APPARATUS FOR A CAMERA

BACKGROUND OF THE INVENTION

1. Field of the Invention

This invention relates to a displaying apparatus more specifically to an information displaying apparatus for a camera which utilizes optical fibers capable of transmitting light, and is capable of presenting information necessary for photographing, in a view finder of the camera and/or on the outer casing of the camera.

2. Description of the Prior Art

Generally speaking, an 8 mm-cine-camera is used more often in daytime than at night. This is because of its performance, that is, conventional cameras and films are not adequate for photographing darkened objects, and in such a case an auxiliary illumination is required with the result of additional preparation. The same situation occurs in all kinds of cameras.

When an operator takes a photograph, he has to perceive and utilize information on phototaking, such as the appropriate exposure given by an exposure meter. In the daytime, such the information can be seen and observed with the aid of natural light. At night, however, the problem arises of reading and observing the information in the dark condition. Since the camera is not often used in the dark, as already mentioned, the problem has heretofore not been regarded as a serious one.

Recently, however, development in film has proceeded so far that sensitivity of film has been improved to provide ASA160(JIS160) film, which is four times as sensitive as the conventional one ASA40(JIS40) films. In addition, development has also arised in lenses for cameras and in the optical path to enlarge the relative aperture of the lens (F-number) to provide a lens having an F-number of six times as large as the previously conventional lenses.

The combination of these improvements, amounts to 24 times, and enables photographs of an object illuminated by only one candle. Such improvement naturally increases opportunity of night photography and thus magnifies the importance of the problem of the difficulties in reading and observing the exposure information in the dark.

SUMMARY OF THE INVENTION

Accordingly, one of the objects of the present invention is to provide a camera in which the information on phototaking can be read and observed even in very dark conditions.

Another object of the present invention is to provide a practical information displaying apparatus for transmitting information using optical fibers.

Yet another object of the present invention is to provide simple apparatus for presenting information on photo-taking.

Other objects of the present invention will be apparent from the following description taken in conjunction with the accompanying drawing wherein:

FIG. 1 is a perspective view of the apparatus, according to the present invention, which comprises an automatic aperture control mechanism for automatically adjusting the aperture in response to object brightness, and means for detecting and displaying the existing setting of the aperture;

FIG. 2 is a plan view of a diaphragm for a camera related to the present invention;

FIG. 3 is a perspective view of the displaying means of the apparatus according to the present invention;

FIG. 4 is a prospect observed by an operator looking into a view finder provided with the displaying means shown in FIG. 3;

FIGS. 5, 6, 7, 8 and 9 show other embodiments of the diaphragms shown in FIG. 1 or 2;

FIG. 10 is a sectional view of a phototaking optical system capable of macrophotography, wherein there is provided with detecting means as shown in FIGS. 1 and 2, and a control mechanism for displaying information as to whether the optical system is in a macrophotographic position or normal photographic position.

Figure 17:
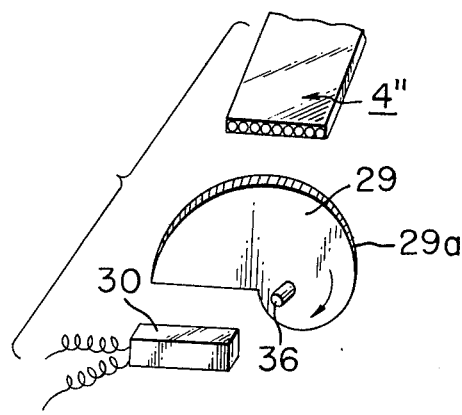
Figure 19:
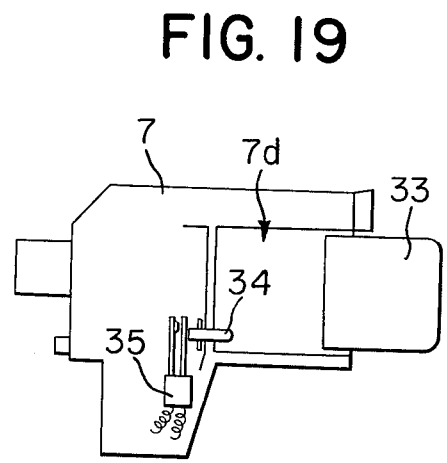
Figure 18:
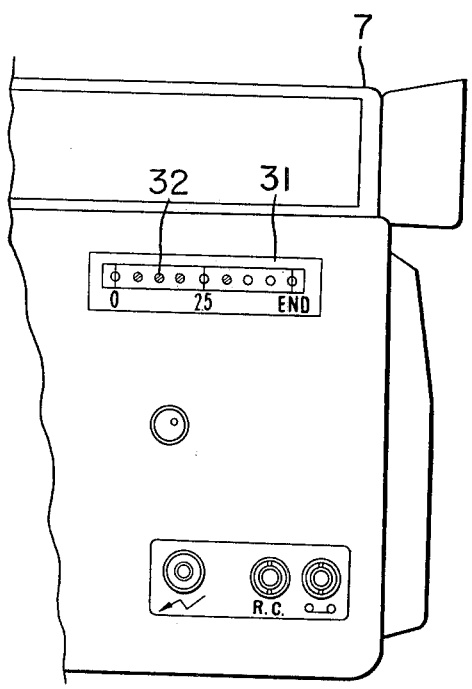
Figure 20:
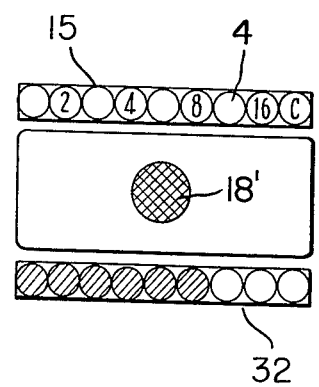

FIG. 17 schematically shows transmitting means for information on footage unexposed, which may be used with a camera equipped with indication for footage unexposed;

FIG. 18 shows displaying means for presenting the information on footage unexposed, the displaying means being provided on the body of the camera;

FIG. 19 shows switching means for controlling the transmitting means for information on footage unexposed;

FIG. 20 shows means for indicating, in a view finder, the information obtained by means shown in FIG. 17:

DESCRIPTION OF THE PREFERRED EMBODIMENTS

In the Figures, the same or similar parts are designated by the same reference characters.

Referring to FIG. 1, there is shown a camera according to the present invention, including an automatic aperture control mechanism for controlling the aperture in accordance with brightness of an object. The automatic aperture control mechanism is shown in greater detail in FIG. 2, including aperture blades 1 and 2, but one of the blades is omitted in FIG. 1 for the sake of simplicity. The aperture blade 1 is supported by a shaft 3a of a movable coil (not shown) of an exposure meter 3 which rotates under control of a conventional exposure meter circuit. The aperture blade 1 is rotatable in response to the rotation of the movable coil of the exposure meter 3, and is provided with a slit 1a for transmitting information on the aperture setting and a projecting pin 1b which will be described hereinafter.

As shown in FIG. 2, the other aperture blade 2 is supported on a shaft 5 fixed on a base plate (not shown) of the exposure meter 3, and is provided with a slit 2a slidably engageable with the projecting pin 1b of the aperture blade 1 and a projection 2b extending oppositely to the slit 2a with respect to the shaft 5. Balancing springs 6a and 6b cooperate with the projection 2b to balance the aperture blade 2.

Referring back to FIG. 1, there are shown bundles $4_1$ to $4_9$ of optical fibers. Each bundle consists of a quite large number of optical fibers of a known kind and is capable of transmitting light from one end thereof to the other. There bundles $4_1$ to $4_9$ are arranged in association with the trace of the movable slit 1a. A casing of the camera is partly shown in phantom lines and designated at reference numeral 7. The casing 7 is provided with an opening 7a to pass light from the outside of the camera to the inside of the camera. A photo-taking optical system is designated at 40. A half-mirror 8 is provided at the light entering portion 7a, and is disposed across the optical axis passing through the slit 1a and the light receiving ends of the optical fibers. Within the camera, there is provided a built-in light source 9, which is actuatable by a switch (not shown). The light emitted from the light source 9 when turned on is reflected by a half-mirror 8 and passes through the slit 1a on to the light receiving end of one of the bundles of optical fibers. The bundles of the optical fibers $4_1$ to $4_9$ are bound together, at the light receiving ends, by a holder 10. The other ends, that is, displaying ends of the bundles of the optical fibers are disposed adjacent a display member 15 and held by a holder 20. The display member 15 may be formed of colored or non-colored transparent thermosetting material, such as plastics. The display member 15 is held in close contact with a part of a transparent mask member 18, or is provided in contiguity thereto, so that it may be located on the image forming surface of the optical system (either the phototaking optical system or the view finder optical system). On the display member 15 there are provided marks or numbers which designate aperture setting values. The marks of numbers are positioned corresponding to their respective displaying ends of the bundles, so that when one of the light receiving ends of the bundles receives the light, only one mark or number which corresponds to the particular bundle is illuminated. The apparatus thus constructed is convenient, since the operator who is viewing through the view finder can be informed of the aperture setting at which the photographing is being performed.

In operation during daytime, the camera is directed to an object to be photographed. The exposure meter is then actuated to rotate the movable coil (not shown), thereby moving the aperture blade 1. These operations are the same as those in a conventional automatic exposure control system. The rotation of the movable coil causes the aperture blade 1 to rotate, thereby causing the other aperture blade 2 through the projecting pin 1b and the slit 2a. The aperture 6 is thus adjusted. Light, which may be natural light, passes through the inlet opening 72 and then, through the slit 1a, on to a light receiving end of only one of the bundles of the optical fibers. The selected one of the bundles of the optical fibers represents the existing setting of the aperture 6. The incident light is transmitted, through the selected bundle of the optical fibers to the other end, or the displaying end thereof, thereby to illuminate the number which corresponds to the selected bundle, and in turn corresponds to the existing aperture setting. The number is clearly displayed in the view finder as shown in FIGS. 3 and 4.

Thus, the operator can confirm the aperture setting at which the phototaking is being performed, by seeing the display member 15.

In operation in dark conditions, wherein natural light is not available for the satisfactory display of the information, the built-in light source 9 is turned on to illuminate the light receiving end of one of the bundles through the half-mirror and the slit 1a. A number on the displaying member 15 is thus clearly displayed even in dark conditions, thereby permitting the operator to obtain the necessary information.

The first embodiment of the present invention thus provides a simple displaying apparatus for aperture setting, by utilizing a plurality of bundles of optical fibers and a slit provided in an aperture blade, said slit being arranged forwardly of the light receiving ends of the bundles to selectively pass the light incident on to the light receiving end. Clear information display occurs even in dark condition, with the aid of the built-in light source 9.

FIGS. 5 to 9 show modified aperture blades which may be used with the system illustrated in FIGS. 1 and 2. In FIG. 5, the aperture blade 1 is provided with a cam surface 1e instead of the slit 1a so as to illuminate a selected series of the bundles. FIG. 6 shows another modified aperture blade, which is provided with a curved slit 1f. Since the deflection angle of the exposure meter is not linear with respect to the aperture setting value, that is, adjusted F-number, such the curved slit 1f is effective to compensate the non-linearity, thereby permitting to employ the displaying means with graduation in equal increments. In FIG. 7, the aperture blade 1 is provided with a curved cam surface 1g, instead of the curvature of the slit, thereby attaining the same effect as of the FIG. 6 embodiment. FIGS. 8 and 9 show a further embodiment of the aperture blade, which is provided with coloured filters 1c and 1d. The filters 1c and 1d cover the light receiving ends of the bundles of the optical fibers at the upper limit and the lower limit of the aperture setting value, respectively, thereby warning the operator who is looking into the view finder.

FIGS. 10 to 14 show an embodiment of information displaying apparatus for use with a camera equipped with an optical system capable of macrophotography. In this embodiment, the display takes place not only for the aperture setting value as shown in FIGS. 1 and 2, but also for the focussing status and the position of the optical system, that is, whether the optical system is in macrophotographic position or not. The optical system shown in FIG. 10, includes focussing lens 22a, variation lens 22b, compensator lens 22c and auxiliary lens 22d, all of which are mounted in a known lens tube 22. The system shown also includes a control mechanism for displaying information that the optical system is being set at the macrophotographic position. The control mechanism is illustrated in perspective in FIG. 11A.

Figure 11A:
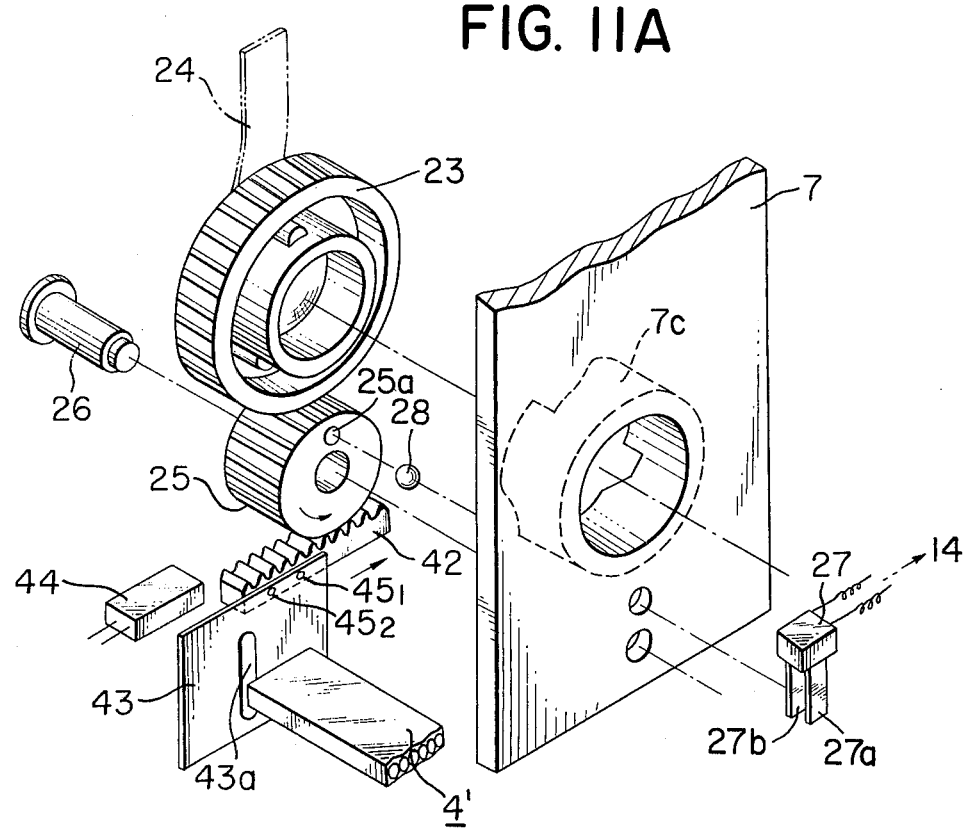
FIG. 11A is a perspective view of the control mechanism of the optical system shown in FIG. 10.
Figure 11B:
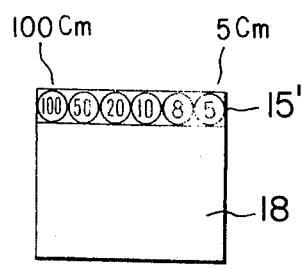
FIG. 11B is a prospect observed by an operator looking through a viewfinder of the displaying means, indicating the information on the photographing distance of the abovementioned optical system located by the control mechanism shown in FIG. 11A.

In FIGS. 10 and 11A, an auxiliary lens holder 23 is rotatably and slidabley mounted on a holder receiving portion 7c of a camera body 7, and is provided with a gear formed therearound. The auxiliary lens holder 23 is normally biased by a leaf spring 24. A switch gear 25 is rotatably journaled on a shaft 26 fixed on the camera body, and meshes with the gear formed on the auxiliary lens holder 23. The switch gear 25 is provided with a recess 25a for receiving a click ball 28 in a hole 7b of the camera body 7 when the system is in normal photographic position. The recess is, of course, provided in the side of the switch gear 25 that faces the camera body 7. The switch gear 25 meshes with a rack 42, on which a plate 43 having a slit 43a is fixed by means of screws $45_1$ and $45_2$. Bundles of optical fibers 4' are arranged as shown in FIG. 11A. A light source 44 is provided to illuminate the light receiving ends of the optical fibers. The plate 43 is disposed between the light source and the light receiving ends of the optical fibers, so as to permit detection of the status of focus in response to the movement of the rack 42 in the direction perpendicular to the optical axis. The result of the detection is displayed in the view finder by means of the displaying means 15' shown in FIG. 11B, in the similar manner as in the embodiment of FIG. 1 and 2, thereby informing the operator of the object distance for which the optical system is adjusted to focus. On the camera body 7, there is provided a switch 27 for controlling the turning on of a light source 14 which will be described hereinafter. The switch 27 includes a contact 27b forcibly engaging the click ball 28 and a contact 27a engageable with the contact 27b.

Figure 12:
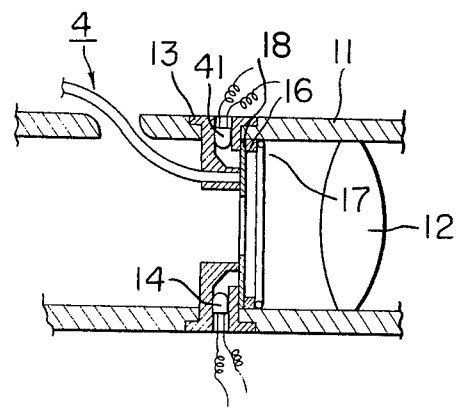
FIG. 12 is a front sectional view of the view finder provided in the camera shown in FIG. 10.
Figure 13:
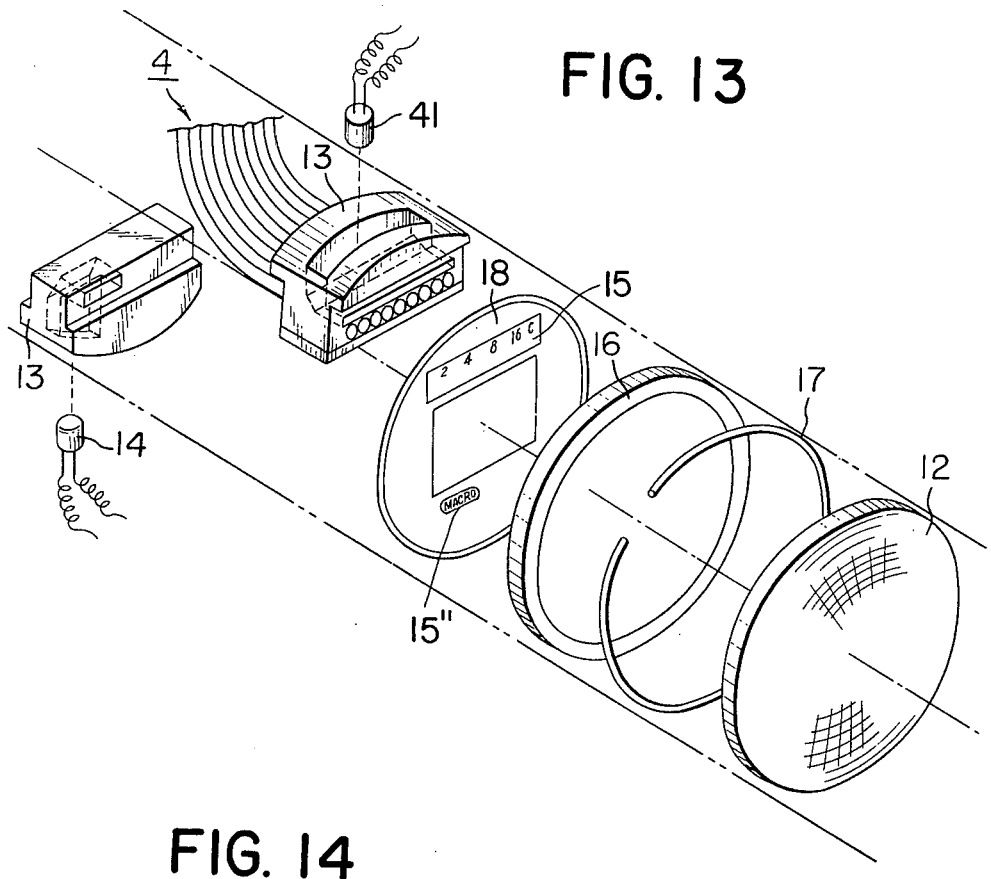
FIG. 13 is an exploded view of the system shown in FIG. 12.
Figure 14:
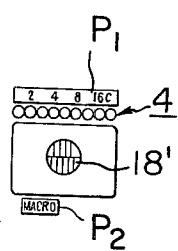
FIG. 14 is a prospect observed by an operator looking into the view finder shown in FIG. 12.

FIGS. 12 to 14 show a displaying apparatus for displaying the focussing condition, particularly, whether the optical system is in the macrophotographic position or not. In these Figures, only the basic elements are shown for the sake of simplicity.

Referring to FIGS. 12 and 13, a view finder tube 11 is provided with a lens 12, a holder 13 for supporting the bundles 4 of the optical fibers and a light source 14 for indicating that the optical system is in the macrophotographic position, the mask member 18 which is in contact with the displaying ends of the bundles of optical fibers, a supporting plate 16 for the mask member 18 and a supporting ring 17 for holding the supporting plate 16. The display member 15 for aperture setting and a display member 15" for macrophotographing information are fixed on the mask member 18. FIG. 14 shows an arrangement of displays which may be presented within the view finder. The existing aperture setting is displayed at a position $P_1$. The adjustment of the optical system for macrophotography is displayed at a position $P_2$. A range finding optical element 18' is formed on the mask member 18. In FIG. 12, an internal light source 41 is shown, which can illuminate the marks of the aperture setting values on the display member 15. The displaying ends of the bundles of the optical fibers, are disposed alongside the marks, in contrast to the embodiment of FIGS. 1 and 2 where these ends are disposed directly on the marks showing the aperture setting values. In operation in dark conditions, the light source 41 is turned on for the purpose of clear display.

The operation for displaying information as to whether the photographing optical system is in the macrophotographic position or not, will be now described. In FIG. 10 explained hereinbefore, the upper half shows a macrophotographic position, while the lower half shows a normal photographic position. In order to switch the photographic optical system from the normal photographic position to the macrophotographic position, the switch gear 25 is rotated, thereby rotating the lens holder 23 meshed with the switch gear 25. By the rotation of the lens holder 23, the auxiliary lens 22d shifts along the optical axis to the macrophotographic position, momentarily to raise the click ball 28 from the recess, thereby closing the switch 27 and in turn, turning on the light source 14. The operator is informed, by the display member 15 that the macrophotography can be performed. Conversely, in order to put the optcal system back into normal photographic position, the gear 25 is rotated in the direction iopposite to that described above. By the rotation of the gear 25, the click ball falls down into the recess, thereby turning off the light source 14 to inform the operator that the optical system is now in the normal photographic position.

Figure 15:
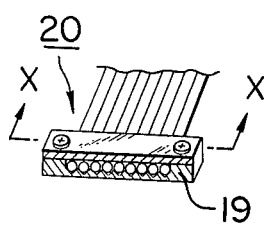
FIG. 15 is a perspective view of supporting means for a bundle of optical fibers for transmitting information.
Figure 16:
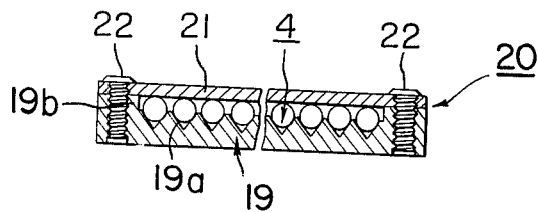
FIG. 16 is an enlarged sectional view taken along line X—X of FIG. 15.

FIG. 15 shows, in greater detail, a holder for the bundles 4 of the optical fibers, which maintain the bundles in linear alignment. FIG. 16 shows the cross section of the holder taken along line X—X. The holder 19 includes a base plate 20 provided with V-shapped grooves 20a for positioning the bundles in a spaced relationship, and a cover plate 21 which cooperates with the base plate to interpose the bundles of the optical fibers therebetween. The cover plate 21 is fixed on the base plate by screws 22 as shown in FIG. 16. Upper surfaces of shoulders 19b of the base plate 19 is so formed that, when the cover plate engages the upper surface of the shoulders 19b, the lower face of the cover plate is generally at the same level of the upper peripheries of the bundles of the optical fibers placed in the grooves 19a, thereby preventing the cover plate 21 from warping. If desired, the bundles in FIGS. 1, 3 and 12 may be furnished as shown in FIGS. 15 and 16.

FIGS. 17, 18, 19 and 20 show a further embodiment for displaying information. This embodiment is related to information on an amount of unexposed film. In FIG. 17, a light source 30 is turned on when the camera is loaded with a film magazine 7b within a magazine accommodating chamber 33, thereby causing a pin 34 to close a switch 35. A cam plate 29 includes a spiral line cam surface 29a and is supported on a shaft 36 between the light receiving ends of bundles 4" of the optical fibers and the light source 30. The cam plate rotates by substantially one full turn for the consumption of the film from the start to the end, thereby changing the plate area blocking light emitted from the light source 30, in accordance with the consumed amount of the film. The other ends of the bundles, that is, the displaying ends may be disposed adjacent to a display member 32 of a film counter 31 provided on the sidewall of the camera body as shown in FIG. 18 or may be disposed so that the display occurs within the view finder as shown in FIG. 20.

As described above, the present invention provides a novel displaying apparatus for presenting information even in a very dark conditions.

Although the invention has been described in its preferred forms with a certain degree of particularity, it is understood that the present disclosure of the preferred form may be changed in the details of construction, and varied combination and arrangement of parts may be resorted without departing from the sprit and the scope of the invention as herein after claimed.

We claim:

1. An information displaying apparatus incorporated in a camera having an exposure control mechanism, which comprises in combination:

a. information displaying means for optically displaying information corresponding to photographic conditions of said camera, and having marks for discriminating information, by which optical displaying of said information is performed, said means being disposed at a position where the displayed information is made observable by an operator of the camera;

b. an optical system for optically transmitting said information to be displayed by said information displaying means, and comprising flexible light transmitting means, wherein light entering through a portion of a first end surface thereof is emitted from a portion of a second end surface thereof, said second end surface of said light transmitting means being disposed in contiguity to said information discriminating marks, and said marks being illuminated by the light emitted from said second end surface; and c. means for optically setting information to be displayed by said information displaying means, said information setting means being operatively connected to said exposure control mechanism to optically set information concerning the exposure value corresponding to a photographic operation of said camera by varying the light receiving portion of said first end surface of said light transmitting means in accordance with the exposure value information as determined by said exposure control mechanism, and being further provided with a colored filter to cause colored light to be supplied to said first end surface of said light transmitting means, when the exposure value to be determined by said exposure control mechanism deviates from a predetermined exposure value range, to indicate improper exposure conditions by means of said information displaying means, whereby the information corresponding to the photographic conditions of said camera is displayed optically by said information displaying means.

2. The information displaying apparatus as claimed in claim 1, wherein said information discriminating marks provided on said information displaying means bear numerical designations to represent exposure values to be determined by said exposure control mechanism.

3. An information displaying apparatus incorporated in a camera having a film feeding mechanism, which apparatus comprises in combination:

a. information displaying mens for optically displaying information corresponding to photographic conditions of said camera, and having marks for discriminating information, by which optical displaying of said information is performed, said means being disposed at a position where the displayed information is made observable by an operator of the camera;

b. an optical system for optically transmitting said information to be displayed by said information displaying means, and comprising flexible light transmitting means, wherein light entering through a portion of a first end surface thereof is emitted from a portion of a second end surface thereof, said second end surface of said light transmitting means being disposed in contiguity to said information discriminating marks, and said marks being illuminated by the light emitted from said second end surface, and c. means for optically setting information to be displayed by said information displaying means, said information setting means being operatively connected to said film feeding mechanism to optically transmit the film consumption information in said camera by varying the light receiving portion of said first end surface of said light transmitting means in accordance with the film consumption information provided by said film feeding mechanism, whereby the information corresponding to the condition of the film consumption in said camera is displayed optically by said information displaying means.

4. The information displaying apparatus as claimed in claim 3, wherein said information discriminating marks provided on said information displaying means bear numerical designations for representing, when selectively illuminated, the film consumption information to be provided by said film feeding mechanism.

5. An information displaying apparatus for a camera equipped to carry out photographing by use of a film accommodated in a cartridge, which comprises in combination:

a. a film feeding device to feed said film accommodated in said cartridge;

b. light masking means operatively connected to said film feeding device, the amount of displacement of said masking means corresponding to the film length fed by said film feeding device;

c. a plurality of flexible optical fibers, one of the two end surfaces each of which is disposed adjacent to said light masking means;

d. means to irradiate light onto said end surface of said optical fibers from the side of said light masking means remote from said fibers, the effective light irradiating area of the light irradiating means with respect to said end surface of said optical fibers being varied in position in accordance with the amount of displacement of said light masking means;

e. information displaying means for displaying the information corresponding to the film length fed by said film feeding device, said displaying means being provided with marks for discriminating information on the film length, and being disposed at a position where the result of the information display is made observable by an operator of said camera, the other end surface of said optical fibers being disposed adjacent to said information discriminating marks, so that light transmitted by said optical fibers from said light irradiating means illuminates said marks, thereby displaying the amount of film consumption.

6. A photographic camera provided with an exposure control device, and which carries out the photographic operations by use of a film accommodated in a cartridge and is capable of displaying photographic information, which comprises in combination:

a. a first light masking means operatively connected to said exposure control device, the amount of displacement of said masking means corresponding to the exposure value information set by said exposure control device;

b. a plurality of first flexible optical fibers, one of the two end surfaces of each of which is disposed in contiguity to said first light masking means;

c. a first light irradiating means for irradiating light onto said end surface of said first optical fibers from the side of said first light masking means remote from said fibers, the effective light irradiating area of said first light irradiating means with respect to said end surface of said first optical fibers being varied in position by the amount of displacement of said first light masking means;

d. a first information displaying means for displaying the exposure value information set by said exposure control device, said information displaying means being provided with exposure value information discriminating marks and being disposed at a position that enables an operator of said camera to observe the result of the information display thereof;

e. a film feeding device to feed said film accommodated in said cartridge;

f. a second light masking means operatively connected to said film feeding device, the amount of displacement of said masking means corresponding to the film length fed by said film feeding device;

g. a plurality of second flexible optical fibers one of the two end surfaces of each of which is disposed in contiguity to said second light masking means;

h. a second light irradiating means for irradiating light onto said end surface of said second optical fibers from the side of said second light masking means remote from said second fibers, the effective light irradiating area of said second light irradiating means being varied in position in accordance with the amount of displacement of said second light masking means; and k. a second information displaying means for displaying the information corresponding to the film length fed by said film feeding device, said second information displaying means being provided with said film length information discriminating marks, and being disposed at a position that enables the operator of the camera to observe the result of the information display, the other end surface of said first optical fibers being disposed in contiguity to said exposure value information discriminating marks and in conformity thereto, so that light transmitted by said first optical fibers from said first light irradiating means illuminates said exposure value information marks, and the other end surface of said second optical fibers being disposed in contiguity to said film length information discriminating marks and in conformity thereto, so that light transmitted by said second optical fibers from said second light irradiating means illuminates said film length information discriminating marks.

7. An information displaying apparatus, which comprises in combination:

a. flexible light transmitting means having first and second end surfaces, wherein light entering through said first end surface thereof is emitted from said second end surface thereof;

b. information displaying means for displaying information by being illuminated with a light beam projected from said second end surface of said light transmitting means, said displaying means being disposed in contiguity to said second end surface of said light transmitting means; and c. means to set information to be displayed by said information displaying means, including:

1. means to selectively activate display of said information having an output member for providing the thus activated information; and 2. a colored filter means which is movable in front of said first end surface of said light transmitting means so as to vary the color of said light beam to illuminate said information displaying means in correspondence to said information, said filter means being operatively connected to the output member of said information activating means, and being driven by said information activating means, whereby the information is displayed subject to meaningful variation in the color light beam, by which said information displaying means is illuminated.

8. An information displaying apparatus incorporated in a camera, which comprises in combination:

a. information displaying means for optically displaying information corresponding to photographic conditions of said camera, said means being disposed at a position where the displayed information is made observable by an operator of the camera;

b. an optical system for optically transmitting said information to be displayed by said information displaying means, and having a flexible light transmitting means, wherein light admitted at a first end surface of said light transmitting means is emitted from a second end surface thereof, the second end surface of said light transmitting means being disposed in contiguity to said information displaying means, and said displaying means being illuminated by the light emitted from said second end surface;

c. means to optically set information to be displayed by said information displaying means having colored filter means which is movable in front of the first end surface of said light transmitting means so as to vary the color of said emitted light to illuminate said information displaying means in association with the operating conditions of the device in said camera which takes part in the photographic operation, said filter means being operatively connected to said device to take part in the photographic operation, whereby information is displayed by selection of the color of light used to illuminate said information displaying means.

9. The information displaying apparatus as claimed in claim 8, further comprising means to irradiate light toward the first end surface of said light transmitting means from the rear side of said information setting means, the light projected by said irradiating means being transmitted by said light transmitting means to irradiate said information displaying means.

10. The information displaying apparatus as claimed in claim 9, wherein said camera has a housing, and said light irradiating means includes: a light receiving window formed in one part of the housing of said camera; and optical means which functions to direct the light received at said light receiving window toward said first end surface of said light transmitting means from the side of said information setting means remote from said first end surface.

11. The information displaying apparatus as claimed in claim 10, wherein said light irradiating means further includes: an artificial light source located within the housing of said camera; and optical means which functions to direct the light emitted from said artificial light source toward said first end surface of said light transmitting means from the side of said information setting means remote from said first end surface.

12. The information displaying apparatus as claimed in claim 9, wherein said camera has a housing, and said light irradiating means includes an artificial light source disposed within the housing of said camera in such a manner that light may be emitted toward said first end surface of said light transmitting means from the side of said information setting means remote from said first end surface.

13. The information displaying apparatus as claimed in claim 8, wherein said information displaying means is provided with marks to discriminate said incoming information, said marks being arranged for illumination by light emitted from said second end surface of said light transmitting means.

14. The information displaying apparatus as claimed in claim 13, wherein said light transmitting means comprises a plurality of optical fibers, each end surface of which is disposed in continuous alignment with the corresponding end surfaces of the other optical fibers of said plurality, and the information discriminating marks of said information displaying means are provided in correspondence to the respective light emitting end surfaces of said optical fibers.

15. The information displaying apparatus as claimed in claim 13, wherein said light transmitting means comprises a plurality of bundles of optical fibers, each end surface of which is disposed in continuous alignment with the corresponding end surfaces of the other bundles of said plurality, and the information discriminating marks of said information displaying means are provided in correspondence to the respective light emitting end surfaces of said bundles of optical fibers.

16. The information displaying apparatus as claimed in claim 13, wherein said information displaying means comprises a light transmitting plate member, on which said information discriminating marks are provided.

17. The information displaying apparatus as claimed in claim 16, wherein said camera is provided with a light path therein for a view finder, and said light transmitting plate member is disposed in said light path for the view finder in such a manner that an operator of the camera is enabled to observe said information discriminating marks.

18. The information displaying apparatus as claimed in claim 16, wherein said camera has a housing, and said information displaying means includes an observation window formed in one part of the housing of said camera, and said plate member is so disposed that said information discriminating marks may be observed through said observation window.

19. The information displaying apparatus as claimed in claim 13, wherein said information setting means is further provided with movable masking means to vary a light receiving area of said first end surface of said light transmitting means to vary the illuminating condition of said respective information discriminating marks in accordance with said incoming information, and wherein said colored filter means is fixed to a portion of said movable masking means.

20. The information displaying apparatus as claimed in claim 19, further comprising means to irradiate light toward said first end surface of said light transmitting means from the side of said information setting means remote from said first end surface, the light supplied by said irradiating means being transmitted by said light transmitting means to illuminate selectively said information discriminating marks of said information displaying means, and the effective irradiating area of said light irradiating means with respect to said first end surface of said light transmitting means being varied in position by said information setting means.

21. An information displaying apparatus for a camera to optically display information corresponding to the photographic conditions of the camera, said camera having a photographic conditions evaluating device, which apparatus comprises in combination:

a. information displaying means for optically displaying said information and having a light transmitting plate member provided with marks thereon for discriminating information, for carrying out information display by selective illumination of said information discriminating marks, said information displaying means being disposed at a position where the result of the information display may be observed by an operator of the camera;

b. information light transmitting means for optically transmitting said information to said information displaying means which includes a plurality of flexible optical fibers, and one of the end surfaces of which is disposed in contiguity to said information discriminating marks which are arranged to be selectively illuminated by the light emitted from said end surface;

c. means to irradiate light on the other end surface of said optical fibers, light so irradiated by said irradiating means being transmitted by said optical fibers to illuminate said information discriminating marks; and d. information setting means for optically setting information to be displayed by said information displaying means including:

1. a movable light masking means for establishing information associated with the photographic conditions of said camera by varying the irradiating range of said other end surface of said optical fibers due to said light irradiating means, said movable light masking means being disposed between said light irradiating means and said other end surface of said optical fibers at a position contiguous to said other end surface, and which is operatively connected to said evaluating device; and 2. colored filter means for irradiating colored light on said other end surface of said optical fibers only when said camera is in improper photographic conditions, as determined by the operational condition of said evaluating device, said colored filter means being fixed to said movable light masking means so as to be interposed between said light irradiating means and said other end surface of said optical fibers, only when said camera is in such inappropriate photographic conditions, whereby the improper photographic conditions are indicated in said camera by said information displaying means.

22. An information displaying apparatus for a camera provided with an exposure control device, which comprises in combination:

a. information displaying means to display exposure value information set by said exposure control device, said information displaying means being provided with marks for discriminating exposure value information, and being disposed at a position where the result of the information display is made observable by an operator of the camera, b. a plurality of flexible optical fibers, one of the two end surfaces of each of which is disposed in contiguity to said information discriminating marks which are arranged to be selectively illuminated by the light emitted from said end surface, c. a movable light masking means which displaces in correspondence to the exposure value to be determined by said exposure control device to vary the light receiving area of the other end surface of said optical fibers so as to establish the exposure value information to be displayed with respect to said information displaying means, said movable masking means being operatively connected to said exposure control device, and, at the same time, being disposed adjacent to said optical fibers, and including colored filter means for projecting colored light into said other end surface of said optical fibers when the exposure value determined by said exposure is deviated from the proper exposure range of said camera, whereby the improper exposure is indicated in said information displaying means by the function of the filter means; and d. means to irradiate light on said other end surface of said optical fibers from the side of said light masking means remote from said fibers, the effective illuminating area of said light irradiating means with respect to said other end surface of said optical fibers being varied in position by the amount of displacement of said light masking means, whereby indications of exposure value information and improper exposure warning are effected.

* * * * *